(12) United States Patent
Verhaeghe et al.

(10) Patent No.: US 10,143,142 B2
(45) Date of Patent: Dec. 4, 2018

(54) AGRICULTURAL BALER WITH AUXILIARY POWER SYSTEM

(71) Applicant: CNH Industrial America LLC, New Holland, PA (US)

(72) Inventors: Didier Verhaeghe, Ypres (BE); Tom Coen, Zemst (BE)

(73) Assignee: CNH Industrial America LLC, New Holland, PA (US)

( * ) Notice: Subject to any disclaimer, the term of this patent is extended or adjusted under 35 U.S.C. 154(b) by 2 days.

(21) Appl. No.: 15/320,569

(22) PCT Filed: Jul. 7, 2015

(86) PCT No.: PCT/EP2015/065473
§ 371 (c)(1),
(2) Date: Dec. 20, 2016

(87) PCT Pub. No.: WO2016/005388
PCT Pub. Date: Jan. 14, 2016

(65) Prior Publication Data
US 2017/0142905 A1     May 25, 2017

(30) Foreign Application Priority Data

Jul. 9, 2014   (BE) .................................. 2014/0541

(51) Int. Cl.
*A01F 15/08* (2006.01)
*B60K 17/28* (2006.01)
*A01F 15/04* (2006.01)

(52) U.S. Cl.
CPC .......... *A01F 15/0841* (2013.01); *A01F 15/04* (2013.01)

(58) Field of Classification Search
CPC ......... E02F 9/2025; E02F 9/26; E02F 9/2045; A01F 15/04; A01B 79/005; A01B 69/008
USPC ......................................................... 701/50
See application file for complete search history.

(56) References Cited

U.S. PATENT DOCUMENTS

| 6,105,353 A | 8/2000 | Mohr et al. |
| 2003/0167939 A1 | 9/2003 | Roth |
| 2014/0137757 A1 | 5/2014 | Nelson et al. |

FOREIGN PATENT DOCUMENTS

| JP | 2008005771 A | 1/2008 |
| JP | 2009240263 A | 10/2009 |
| JP | 2010273622 A | 12/2010 |
| WO | 2013135794 A1 | 9/2013 |

*Primary Examiner* — Maceeh Anwari
(74) *Attorney, Agent, or Firm* — Peter K. Zacharias; Patrick M. Sheldrake (57) ABSTRACT

An agricultural baler includes a main bale chamber, a plunger reciprocally movable within the main bale chamber through a compression cycle, a flywheel associated with the movement of the plunger, and a driveline associated with the flywheel and couplable with a power take-off of a traction unit. The baler has an auxiliary power system coupled with the driveline. The auxiliary power system includes a power indicator providing an output signal representing a parameter associated with power usage during the compression cycle of the plunger, a power device for at least one of receiving power from and transferring power to the driveline, and an electrical processing circuit coupled with the power indicator and the power device. The electrical processing circuit is operable for receiving the output signal(s) and controlling operation of the power device, dependent upon the output signal(s).

20 Claims, 5 Drawing Sheets

AGRICULTURAL BALER WITH AUXILIARY POWER SYSTEM

CROSS REFERENCE TO RELATED APPLICATION

This application is the National Stage of International Application No. PCT/EP2015/065473 filed Jul. 7, 2015, which claims priority to Belgium Patent Application No. 2014/0541 filed Jul. 9, 2014, the contents of which are incorporated herein by reference.

FIELD OF THE INVENTION

The present invention relates to agricultural balers, and, more particularly, to systems for powering such balers.

DESCRIPTION OF THE RELATED ART

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. The plunger may include a number of rollers which extend laterally outward from the sides of the plunger. The rollers on each side of the plunger are received within a respective plunger slot formed in the side walls of the bale chamber, with the plunger slots guiding the plunger during the reciprocating movements.

When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

During a compression cycle of the plunger as described above, the plunger moves through a compression stroke as it advances into the main bale chamber, with the highest load on the plunger occurring at the end of each compression stroke. As balers become increasingly larger, the peak loads on the plunger during compression strokes likewise become increasingly larger. One way to compensate for these higher peak loads is to use a larger flywheel coupled with a gearbox which drives the plunger. As the plunger reaches the end of the compression stroke, the momentum of the heavier flywheel helps carry the plunger through the peak load at the end of the compression stroke. If the flywheel is not heavy enough then high loads are transferred back through the driveline to the traction unit, which can result in lugging down of the engine onboard the traction unit. However, a flywheel which is too large is also undesirable since it typically requires a traction unit with a larger horsepower (HP) rating to start and drive the flywheel forming part of the driveline of the baler.

What is needed in the art is an agricultural baler which accommodates large peak loads during compression strokes of the plunger.

SUMMARY OF THE INVENTION

The present invention provides an agricultural baler with an auxiliary power system which scavenges power from the driveline of the baler during off-peak load periods and transmits power back to the driveline for use during peak load periods.

The invention in one form is directed to an agricultural baler, including a main bale chamber, a plunger reciprocally movable within the main bale chamber through a compression cycle, a flywheel associated with the movement of the plunger, and a driveline associated with the flywheel and couplable with a power take-off (PTO) of a traction unit. The agricultural baler is characterized by an auxiliary power system coupled with the driveline. The auxiliary power system includes a power indicator providing an output signal representing a parameter associated with power usage during the compression cycle of the plunger, a power device for receiving power from and/or transferring power to the driveline, and an electrical processing circuit coupled with the power indicator and the power device. The electrical processing circuit is operable for receiving the output signal(s) and controlling operation of the power device, dependent upon the output signal(s).

An advantage of the present invention is that power is scavenged from the baler during off-peak load periods, and transmitted back to the driveline prior to and during peak loads.

Another advantage is that a traction unit with a smaller HP rating can be used to drive the baler.

Yet another advantage is that the baler can be equipped with a smaller flywheel.

A further advantage is that lower PTO power is required: up to 40%, depending on the duty cycle of the baler.

A still further advantage is that fuel consumption is reduced, since a smaller traction unit may be used.

Another advantage is that the APS results in greater comfort for the operator, since peak impulse loads are not transferred back through the driveline to the traction unit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
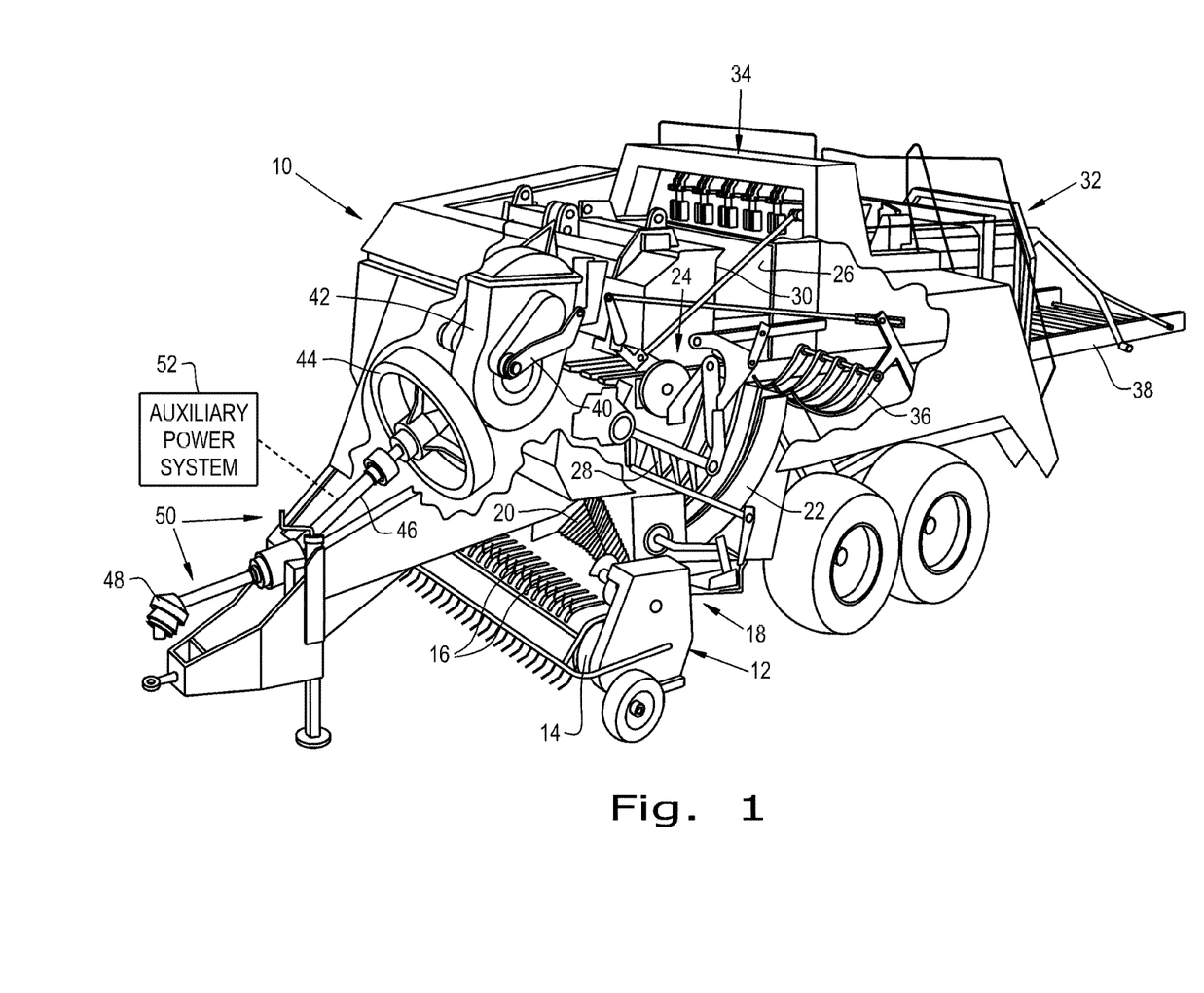
FIG. 1 is a perspective cutaway view showing the internal workings of a large square baler, which may include an APS of the present invention.

Referring now to the drawings, and more particularly to FIG. 1, there is shown a perspective cutaway view showing the internal workings of a large square baler 10. Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit. Without the flywheel, a large mechanical load (impulse) is placed on the traction unit as peak power is required by the baler during operation, such as at the end of a compression stroke and/or during a stuffer unit stroke. Generally speaking, as balers become increasingly larger the size of the flywheel also becomes increasingly larger. A larger flywheel also in turn typically requires the use of a traction unit with a higher horsepower rating, to maintain input power to the drive shaft 46 during operation, and since higher power is required to start rotation of the flywheel from an at-rest position.

Figure 2:
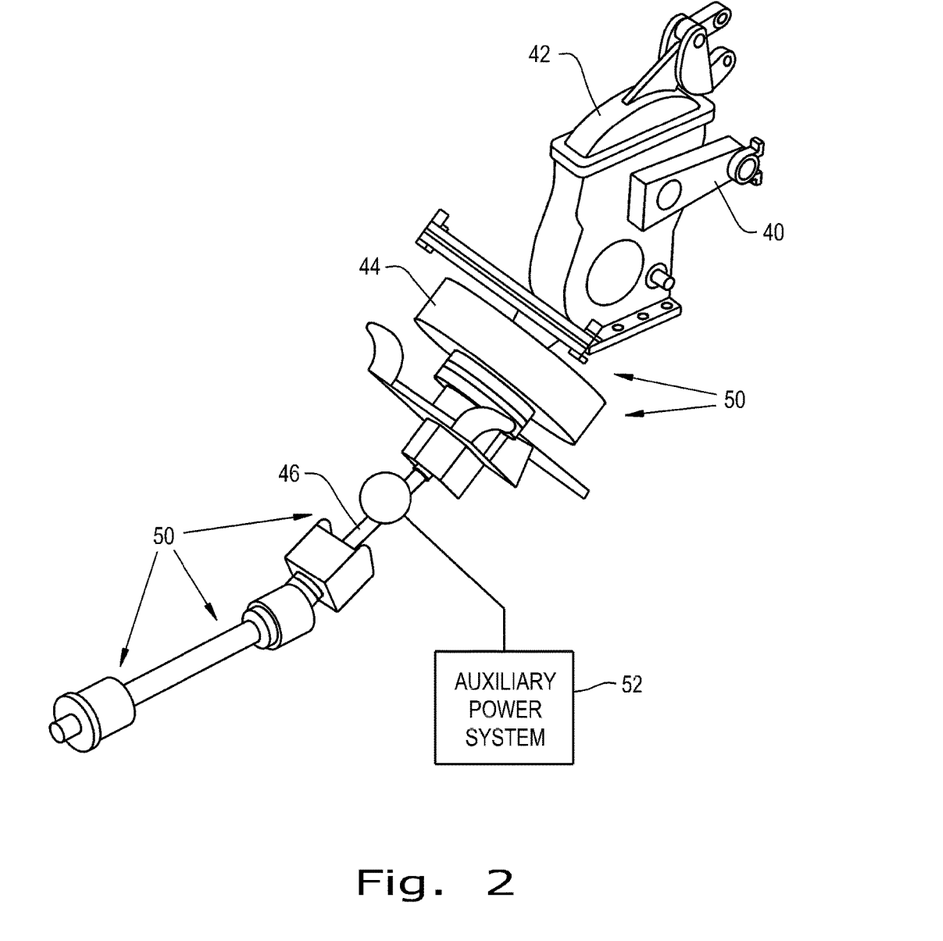
FIG. 2 is a perspective view of the driveline, gearbox and APS shown in FIG. 1.
Figure 3:
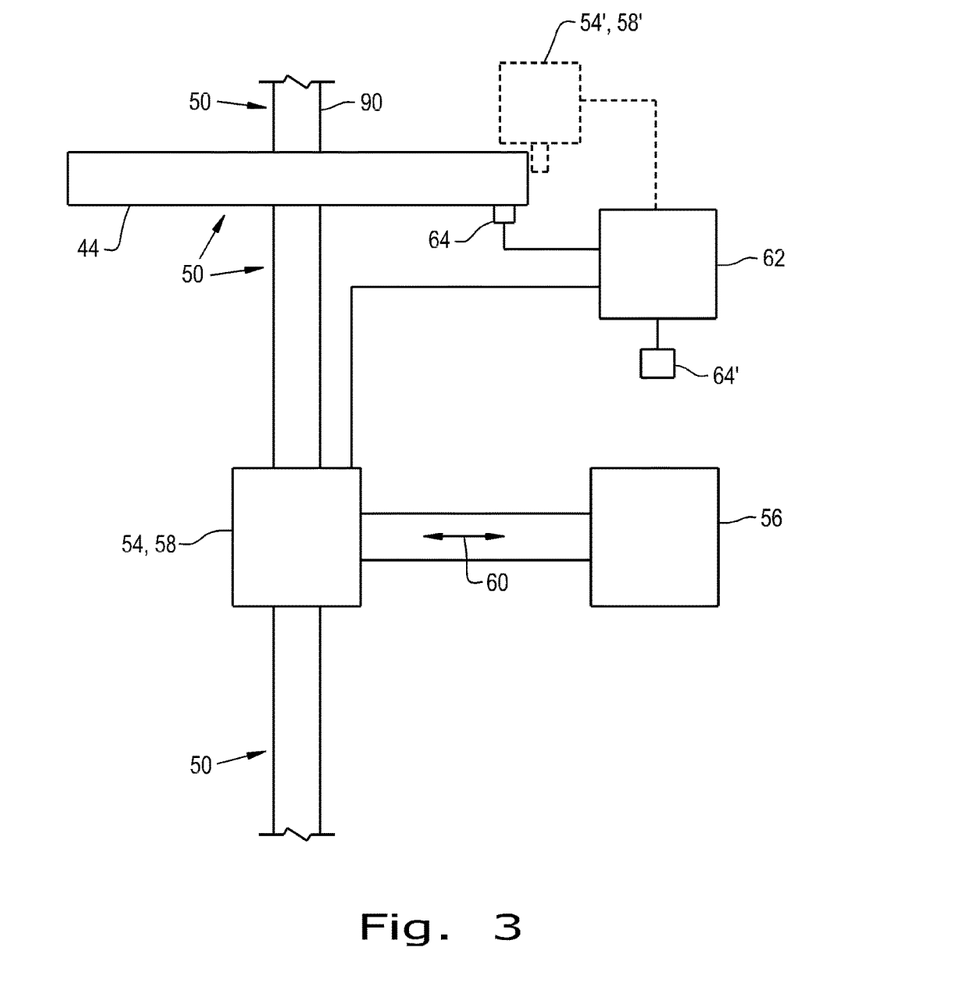
FIG. 3 is a block diagram showing a simplified embodiment of the APS of the present invention.

Referring now to FIGS. 1-3, conjunctively, baler 10 also includes an auxiliary power system (APS) 52 which is coupled with the driveline 50 in parallel with the flywheel 44, in a mechanical power distribution sense and not necessarily a geometric sense. The APS 52 generally functions to receive power from the driveline 50, store the power, and transmit the stored power back to the driveline 50.

APS 52 generally includes a power generation device 54 for receiving power from the driveline 50 and generating power, a power storage device 56 coupled with and storing power from the power generation device 54, and a power feedback device 58 for transmitting the stored power back to the driveline. The power generation device 54 and the power feedback device 58 are each generically referred to separately or together as a power device, since they each transfer power, depending upon how the APS 52 is configured. For example, in the block diagram shown in FIG. 3, the power generation device 54 and the power feedback device 58 are configured as the same unit which can operate with different functionality, such as a hydraulic pump/motor or an electric motor/generator. When configured as a hydraulic pump/motor, the power storage device 56 can be in the form of one or more hydraulic accumulators. Alternatively, when configured as an electric motor/generator, the power storage device 56 can be in the form of one or more ultracapacitors and/or batteries. With this type of dual functionality, the power storage device 56 is connected with the power generation device 54/power feedback device 58 in a bidirectional manner allowing 2-way flow of power, as indicated by double headed arrow 60.

Alternatively, the power generation device 54 and the power feedback device 58 can be separate and discrete units which are each coupled with the driveline 50 and power storage device 56. For example, the power generation device 54 can be in the form of a hydraulic pump, and the power feedback device 58 can be in the form of a separate hydraulic motor, each of which are mechanically coupled with the driveline 50 and hydraulically coupled with a power storage device in the form of an accumulator (not specifically shown). Moreover, the power generation device 54 can be in the form of an electric motor, and the power feedback device 58 can be in the form of a separate electric generator, each of which are mechanically coupled with the driveline 50 and electrically coupled with a power storage device 56 in the form of an ultracapacitor and/or battery (not specifically shown).

The power storage device 56 shown in FIG. 3 can also be configured differently than one or more hydraulic accumulators, ultracapacitors and/or batteries. For example, the power storage device 56 can be configured as an additional mechanical flywheel which receives/transmits power from/to the driveline 50. The power generation device 54 and the power feedback device 58 can be configured as a continuously variable transmission (CVT), and the additional flywheel would somehow be capable of receiving and storing power during off-peak load periods and transferring the power back to the driveline 50 for use during peak load periods.

For purposes of discussion hereinafter, it will be assumed that the power generation device 54 and the power feedback device 58 are in the form of a singular unit configured as a hydraulic pump/motor. Pump/motor 54, 58 is coupled with and under the control of an electrical processing circuit 62, which can be in the form of an electronic control unit (ECU) or an analog processor. Electrical processing circuit 62 can be a dedicated ECU onboard the baler 10, or can also be part of an ECU used for other purposes onboard the baler 10. Alternatively, electrical processing circuit 62 can also be an ECU onboard the traction unit which tows the baler 10, and can be coupled with the pump/motor 54, 58 and other components onboard baler 10 in a wired or wireless manner.

Electrical processing circuit 62 controls operation of pump/motor 54, 58 in a manner such that power is transmitted to the driveline 50 prior to and during peak load periods on the baler 10, and power is received from the driveline 50 during off-peak load periods on the baler 10. More specifically, power is transmitted to/from the driveline 50 dependent upon one or more power indicators which each provide an output signal representing a parameter associated with power usage during the compression cycle of the plunger 30. The power indicator(s) generally provide(s) an output signal representative of a parameter associated with the compression cycle of plunger 30, and more specifically provides an output signal representative of a parameter associated with the plunger 30 within the main bale chamber 26, and/or a parameter associated with the formation of a slice of crop material within the bale chamber 26.

To this end, the electrical processing circuit 62 is connected with one or more sensors 64, 64' which provide output signals indicative of the position of or load on the plunger 30 and/or a crop slice variable. Examples of sensed parameters associated with the plunger can include: a position, speed and/or load on the plunger; a position, speed and/or load associated with the gearbox; a speed of the flywheel; a position of the flywheel; and/or a position of a crankarm attached to the plunger. In the embodiment shown in FIG. 3, the sensor 64 is positioned adjacent to flywheel 44 to determine the rotational position of the flywheel 44, such as by using a proximity sensor, optical sensor, etc. The position of the flywheel 44 can in turn be used to establish the position of the plunger 30 within the main bale chamber 26. Alternatively, the sensor 64' can be configured to sense a variable associated with crop slice formation within the main bale chamber 26. Examples of crop slice formation variables may include: a moisture content of the crop material; a thickness of a given slice of crop material; and/or, a positional change of the plunger at maximum compression for each slice of the crop material. Alternatively, the parameter associated with the crop slice formation can even be input by a user, such as a particular type of crop material being harvested. Other input parameters may also be used for controlling operation of APS 52.

Figure 4:
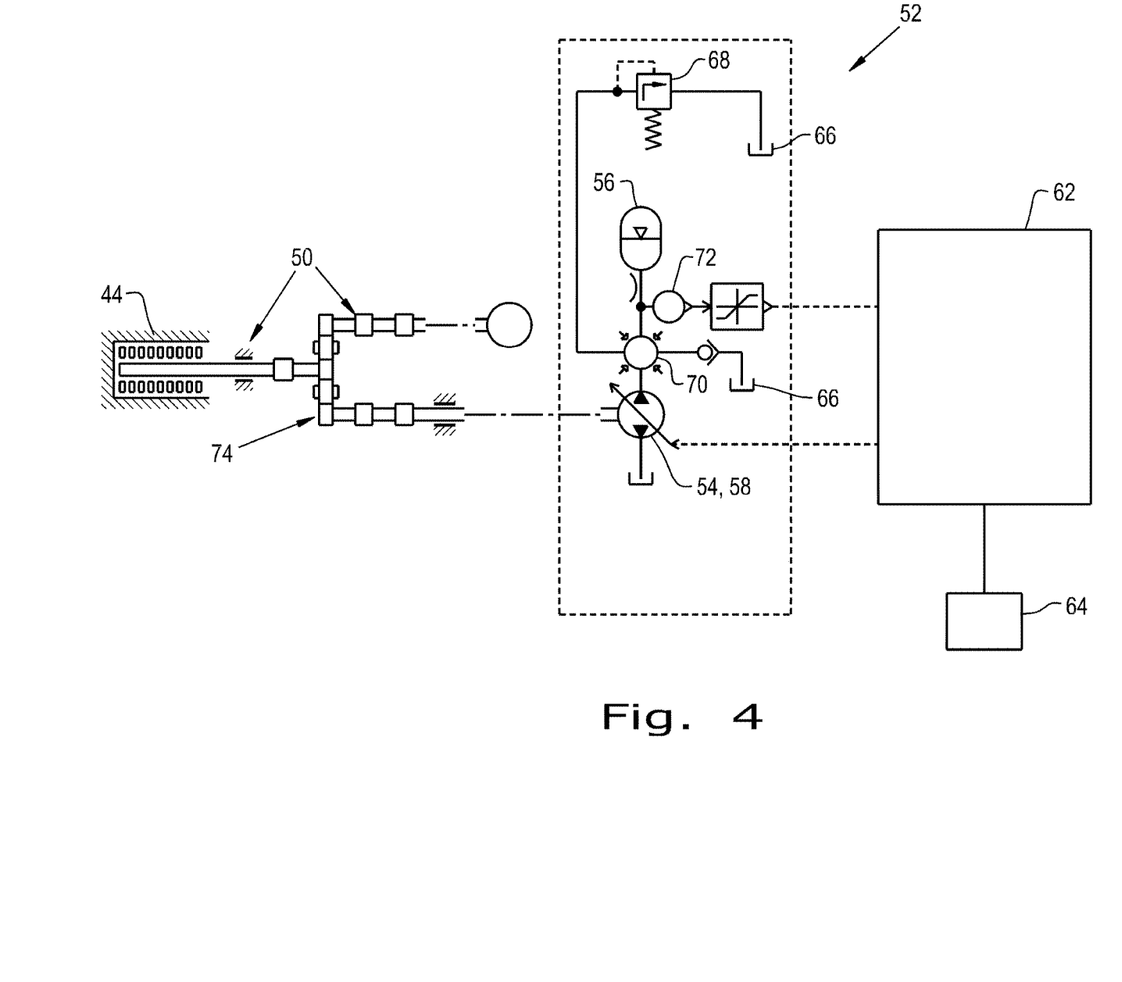
FIG. 4 is a control schematic of an embodiment of the APS of the present invention.
Figure 5:
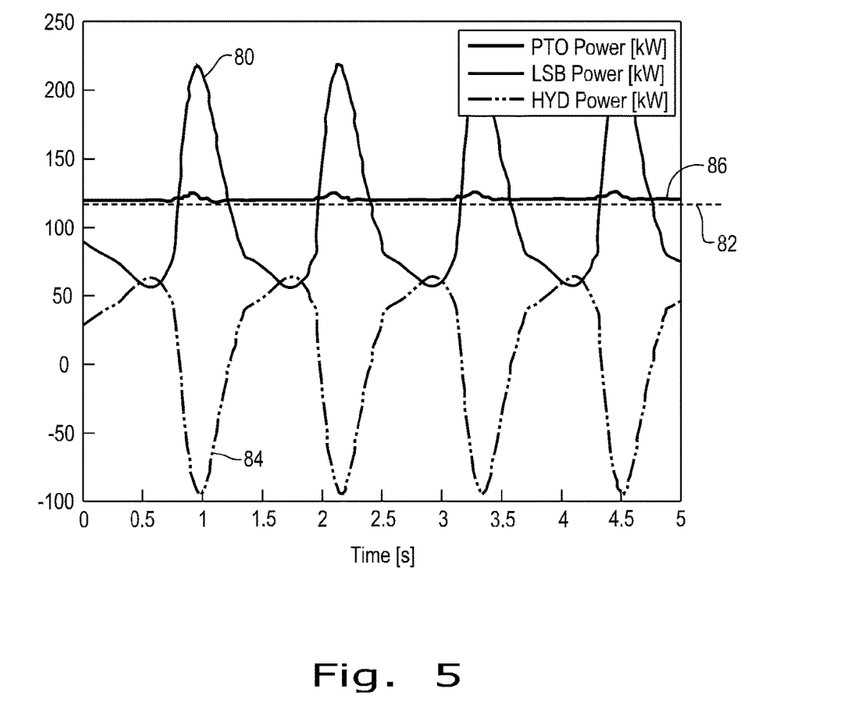
FIG. 5 is a graphical illustration of required power during compression cycles of the baler, hydraulic power input by the APS, and resultant PTO power as a result of the power input by the APS.

Referring now to FIG. 4, there is shown a control schematic of the APS 52 shown in FIGS. 1-3. APS 52 can be thought of as defining a hydraulic flywheel which is based on an over-center variable displacement pump/motor 54, 58 connected between the accumulator 56 and a tank 66. In order to avoid any overpressure, a pressure relief valve 68 is installed between the pump/motor 54, 58 and the accumulator 56. A check valve 70 is also connected to the tank 66 in order to avoid cavitation of the pump/motor 54, 58. A pressure transducer 72 is used to manage the displacement of the pump/motor 54, 58. Basically, during a typical duty cycle, the pump/motor 54, 58 works as a real pump charging the accumulator 56 when the instant power of the baler 10 is lower than the average power (FIG. 5). On the other hand, when the plunger 30 is in a compressing stroke, the pump/motor 54, 58 works as a motor converting hydraulic power into mechanical power that can be provided to the driveline 50. In this way, the typical peak power can be avoided and the PTO power provided from the tractor is always close to the average power. The pump size is a function of the maximum pressure in the accumulator 56 and the operating speed of the pump/motor 54, 58. Because of the additional gearbox 74 coupled with the driveline 50, the pump speed can be increased, e.g., from 1000 RPM (the typical PTO speed during working conditions) up to approximately 2680 RPM. This higher speed allows the use of a smaller pump with a higher hydraulic efficiency and faster response time, in contrast with a larger pump needed when operating at a lower speed condition.

During operation of the baler 10, the plunger 30 reciprocates back and forth during compression cycles within the main bale chamber 26. In the embodiment of the large square baler shown in the graph of FIG. 5, as the plunger 30 reciprocates back and forth (indicated by the top generally sinusoidal curve 80), the power required at the PTO shaft of the large baler can fluctuate between a minimum power requirement up to approximately four times the minimum power requirement (e.g., between approximately 55 and 215 kW). However, the average power indicated by the horizontal dashed line 82 is only about two times the minimum power requirement (e.g., 107 kW). On the other hand, the power provided by the hydraulic pump/motor 54, 58 to the driveline 50 (indicated by the bottom generally sinusoidal curve 84) generally offsets the power fluctuations required at the PTO shaft. Thus, the resultant power required at the PTO shaft is indicated by the generally horizontal line 86 just above the average power line 82.

In the embodiment of APS 52 described above, the system is assumed to be a hydraulic system with a pump/motor 54, 58 connected between the PTO coupler 48 and the flywheel 44. However, the exact location of the connection between the APS 52 and the driveline 50 can vary. For example, referring to FIG. 3, a pump/motor 54', 58' (shown in dashed lines as an optional attachment location) can also engage splines or gear teeth (not shown) formed at the periphery of flywheel 44. As a further example, a pump/motor can be connected with an input shaft 90 of gearbox 42. Thus, it is apparent that wherever power can be scavenged along the length of driveline 50, APS 52 can be coupled with the driveline 50 for transmitting power to/from the driveline 50, in a manner as described above.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
    a main bale chamber;
    a plunger reciprocally movable within the main bale chamber through a compression cycle;
    a flywheel associated with the movement of the plunger;
    a driveline associated with the flywheel and couplable with a power take-off of a traction unit; and
    an auxiliary power system coupled with the driveline, the auxiliary power system comprising:
        a power indicator providing an output signal representing a parameter associated with power usage during the compression cycle of the plunger, the power indicator comprising at least one sensor configured for sensing a parameter associated with the compression cycle;
        a power device configured for at least one of receiving power from and transferring power to the driveline; and
        an electrical processing circuit coupled with the power indicator and the power device, the electrical processing circuit configured for receiving the output signal and controlling operation of the power device, dependent upon the output signal.

2. The agricultural baler of claim 1, wherein the at least one sensor is configured for sensing:
    at least one of a position, speed and load on the plunger;
    at least one of a position, speed and load associated with a gearbox;
    at least one of a position and speed of the flywheel; or
    a position of a crankarm attached to the plunger.

3. The agricultural baler of claim 1, wherein the electrical processing circuit is configured for controlling operation of the power device to receive power from the driveline and generate power, dependent upon the output signal.

4. The agricultural baler of claim 3, further comprising a power storage device coupled with and storing power from the power device.

5. The agricultural baler of claim 4, wherein the electrical processing circuit is configured for controlling operation of the power device to transmit power back to the driveline dependent upon the output signal.

6. The agricultural baler of claim 1, wherein the electrical processing circuit is located onboard at least one of a frame of the baler and the traction unit.

7. The agricultural baler of claim 1, wherein the plunger is reciprocally movable in the main bale chamber during a compression stroke and a return stroke, and wherein the auxiliary power system is configured for receiving power from the driveline during a portion of the return stroke.

8. The agricultural baler of claim 7, wherein the auxiliary power system is further configured for transmitting power to the driveline during a portion of the compression stroke.

9. The agricultural baler of claim 8, wherein the auxiliary power system is configured for transmitting power to the driveline for a portion of the compression stroke prior to a peak load on the plunger.

10. The agricultural baler of claim 1, wherein the auxiliary power system is configured for receiving power from the driveline, storing the power, and transmitting the stored power back to the driveline.

11. The agricultural baler of claim 10, wherein the power device includes a power generation device for receiving power from the driveline and generating power, and a power feedback device for transmitting the power back to the driveline, and further including a power storage device for storing the generated power.

12. The agricultural baler of claim 11, wherein the power storage device comprises a hydraulic accumulator, and wherein the power generation device comprises a hydraulic machine functioning as a hydraulic pump coupled with the hydraulic accumulator, and the power feedback device is derived by the hydraulic machine functioning as a motor when transmitting the stored power back to the driveline from the hydraulic accumulator.

13. The agricultural baler of claim 11, wherein the power storage device comprises one of a capacitor and a battery, and wherein the power generation device comprises an electric machine functioning as an electric motor and the power feedback device is derived by the electric machine functioning as an electric generator when transmitting the stored power back to the driveline.

14. The agricultural baler of claim 1, wherein the driveline comprises a PTO coupler at an input end thereof, and the auxiliary power system is coupled with the driveline between the PTO coupler and the flywheel.

15. An agricultural baler, comprising:
    a main bale chamber;
    a plunger reciprocally movable within the main bale chamber through a compression cycle;
    a flywheel associated with the movement of the plunger;
    a driveline associated with the flywheel and couplable with a power take-off of a traction unit; and
    an auxiliary power system coupled with the driveline, the auxiliary power system comprising:
        a power indicator providing an output signal representing a parameter associated with power usage during the compression cycle of the plunger;
        a power device configured for at least one of receiving power from and transferring power to the driveline; and
        an electrical processing circuit coupled with the power indicator and the power device, the electrical processing circuit configured for receiving the output signal and controlling operation of the power device, dependent upon the output signal,
    wherein the auxiliary power system is configured for receiving power from the driveline, storing the power, and transmitting the stored power back to the driveline.

16. The agricultural baler of claim 15, wherein the power device includes a power generation device for receiving power from the driveline and generating power, and a power feedback device for transmitting the power back to the driveline, and further including a power storage device for storing the generated power.

17. The agricultural baler of claim 16, wherein the power storage device comprises a hydraulic accumulator, and wherein the power generation device comprises a hydraulic machine functioning as a hydraulic pump coupled with the hydraulic accumulator, and the power feedback device is derived by the hydraulic machine functioning as a motor when transmitting the stored power back to the driveline from the hydraulic accumulator.

18. The agricultural baler of claim 16, wherein the power storage device comprises one of a capacitor and a battery, and wherein the power generation device comprises an electric machine functioning as an electric motor and the power feedback device is derived by the electric machine functioning as an electric generator when transmitting the stored power back to the driveline.

19. An agricultural baler, comprising:

a main bale chamber;

a plunger reciprocally movable within the main bale chamber through a compression cycle having a compression stroke and a return stroke;

a flywheel associated with the movement of the plunger;

a driveline associated with the flywheel and couplable with a power take-off of a traction unit; and an auxiliary power system coupled with the driveline, the auxiliary power system comprising:

a power indicator providing an output signal representing a parameter associated with power usage during the compression cycle of the plunger;

a power device configured for at least one of receiving power from and transferring power to the driveline; and an electrical processing circuit coupled with the power indicator and the power device, the electrical processing circuit configured for receiving the output signal and controlling operation of the power device, dependent upon the output signal, wherein the auxiliary power system is configured for receiving power from the driveline during a portion of the return stroke.

20. The agricultural baler of claim 19, wherein the auxiliary power system is further configured for transmitting power to the driveline during a portion of the compression stroke.

* * * * *